United States Patent [19]

Neri et al.

[11] Patent Number: 5,701,725
[45] Date of Patent: Dec. 30, 1997

[54] METHOD AND MACHINE FOR PRODUCING WRAPPINGS FOR PRODUCTS

[75] Inventors: Armando Neri, Bologna; Mario Turra, Casalecchio di Reno, both of Italy

[73] Assignee: G.D Societa' Per Azioni, Bologna, Italy

[21] Appl. No.: 688,767

[22] Filed: Jul. 31, 1996

[30] Foreign Application Priority Data

Aug. 1, 1995 [IT] Italy .................... BO95A0391

[51] Int. Cl.⁶ .................... B65B 11/40; B65B 19/22; B65B 51/10; B23K 26/00
[52] U.S. Cl. .................... 53/466; 53/234; 53/375.9; 53/376.2; 53/416; 219/121.63; 219/121.64
[58] Field of Search .................... 53/466, 461, 416, 53/375.9, 376.2, 373.8, 370.8, 377.8, 234, 228, 232, 230; 219/121.64, 121.63

[56] References Cited

U.S. PATENT DOCUMENTS

| 4,691,093 | 9/1987 | Banas et al. ............ 219/121.64 X |
| 4,847,462 | 7/1989 | Soodak et al. ............ 219/121.63 |
| 4,945,203 | 7/1990 | Soodak et al. ............ 219/121.64 |
| 5,154,035 | 10/1992 | Cavazza ............ 53/375.9 X |
| 5,477,661 | 12/1995 | Draghetti et al. ............ 53/466 |
| 5,613,344 | 3/1997 | Osti et al. ............ 53/375.9 X |

FOREIGN PATENT DOCUMENTS

| 0 472 850 | 3/1992 | European Pat. Off. . |
| 0 483 569 | 5/1992 | European Pat. Off. . |
| 2 246 109 | 1/1992 | United Kingdom . |

OTHER PUBLICATIONS

European Search Report, EP 96 11 2054, Nov. 11, 1996.

*Primary Examiner*—James F. Coan
*Attorney, Agent, or Firm*—Oblon, Spivak, McClelland, Maier & Neustadt, P.C.

[57] ABSTRACT

A wrapping method and machine for producing wrappings for products, whereby a sheet of wrapping material is folded about a respective product so that at least a first and a second portion of the sheet of wrapping material are superimposed one on top of the other, with the first portion outside the second; and the two portions are sealed to each other by compressing the two portions onto each other, and sweeping at least one laser beam along a sealing portion of the first portion.

38 Claims, 5 Drawing Sheets

METHOD AND MACHINE FOR PRODUCING WRAPPINGS FOR PRODUCTS

BACKGROUND OF THE INVENTION

The present invention relates to a method of producing wrapping for products.

In particular, the present invention relates to a wrapping method for producing wrappings for preferably, but not necessarily, parallelepiped products or similar, and which may be used to advantage for producing wrappings of transparent material on machines for wrapping packets of cigarettes.

On known wrapping machines, the above wrappings are normally formed by feeding the products successively in a given direction along a given path, and by feeding, for each product, a sheet of wrapping material across the path and in front of the opening of a radial pocket formed on the periphery of a wrapping wheel, which is rotated in steps about its axis so as to arrest the pockets at an input station of the wheel long enough to receive the product for wrapping.

In general, insertion of the product inside the respective pocket is accompanied by simultaneous insertion of the respective sheet of wrapping material, which is folded gradually into a U about the product as this is fed into the pocket.

On the wrapping wheel, a tubular wrapping is then formed about the product by superimposing the two free ends of the U-shaped sheet along one side of the product; and the two opposite ends of the tubular wrapping are then closed and sealed at an output channel of the wheel to complete the wrapping.

The above known method presents a major drawback, mainly due to the operating speed of the machine. That is, as the operating speed of the machine increases, the sealing time available decreases, so that, to seal the end portions, the temperature of the sealing elements must be increased. With currently used wrapping materials, however, which are relatively thin for environmental reasons, this increases the risk of the wrappings being burned.

To eliminate the above drawback, wrapping wheels have been devised wherein sealing elements are provided for each pocket on the wheel and travel together with the products, thus increasing the sealing time for a given operating speed of the machine. At the same time, however, such a solution greatly complicates the design and hence increases the production and maintenance cost of the machine.

SUMMARY OF THE INVENTION

It is an object of the present invention to provide a straightforward, low-cost method designed to overcome the aforementioned drawbacks.

According to the present invention, there is provided a wrapping method for producing wrappings for products, the method comprising the steps of folding a sheet of wrapping material about a respective product, so that at least a first and a second portion of said sheet of wrapping material are superimposed one on top of the other with the first portion outside the second; and connecting said two portions to each other by sealing; the method being characterized in that said connecting step comprises the further steps of compressing said two portions onto each other, and sweeping at least one laser beam along a sealing portion of said first portion.

The present invention also relates to a wrapping machine for producing wrappings for products.

According to the present invention, there is provided a machine for producing wrappings for products, the machine comprising wrapping means for folding a sheet of wrapping material about a respective product, so that at least a first and a second portion of said sheet of wrapping material are superimposed one on top of the other with the first portion outside the second; and at least one connecting means for connecting said two portions by sealing; the machine being characterized by comprising a compressing device for compressing said two portions onto each other; and a laser sealing assembly comprising at least one laser source for emitting a respective laser beam with which to sweep a sealing portion of said first portion.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
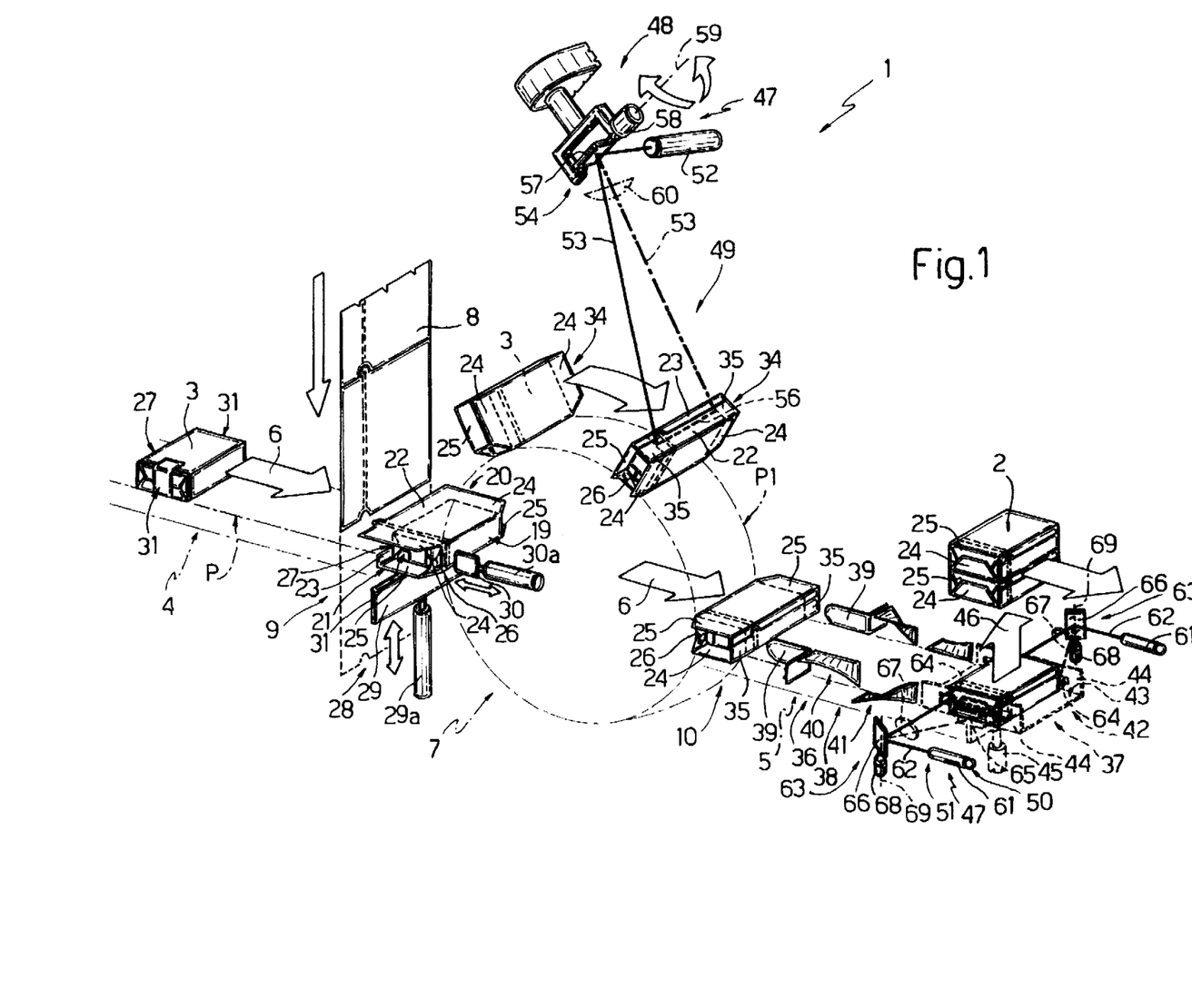
FIG. 1 shows a schematic view, with parts removed for clarity, of a first preferred embodiment of the machine according to the present invention.

Number 1 in FIG. 1 indicates a wrapping machine for producing wrappings 2 for products 3, in particular packets of cigarettes.

Machine 1 comprises a known input conveyor device 4 and a known output conveyor device 5, for successively feeding products 3 in a given direction 6 and along a wrapping path P extending along machine 1; and a wrapping device 7 located along path P, between devices 4 and 5, and which receives products 3 together with respective sheets 8 of heat-sealable wrapping material fed across path P by a known supply device (not shown) at an input station 9. Products 3 and sheets 8 are fed in steps along an intermediate portion P1 of path P extending from station 9 to an output station 10 of device 7.

Figures 2, 5, 9:
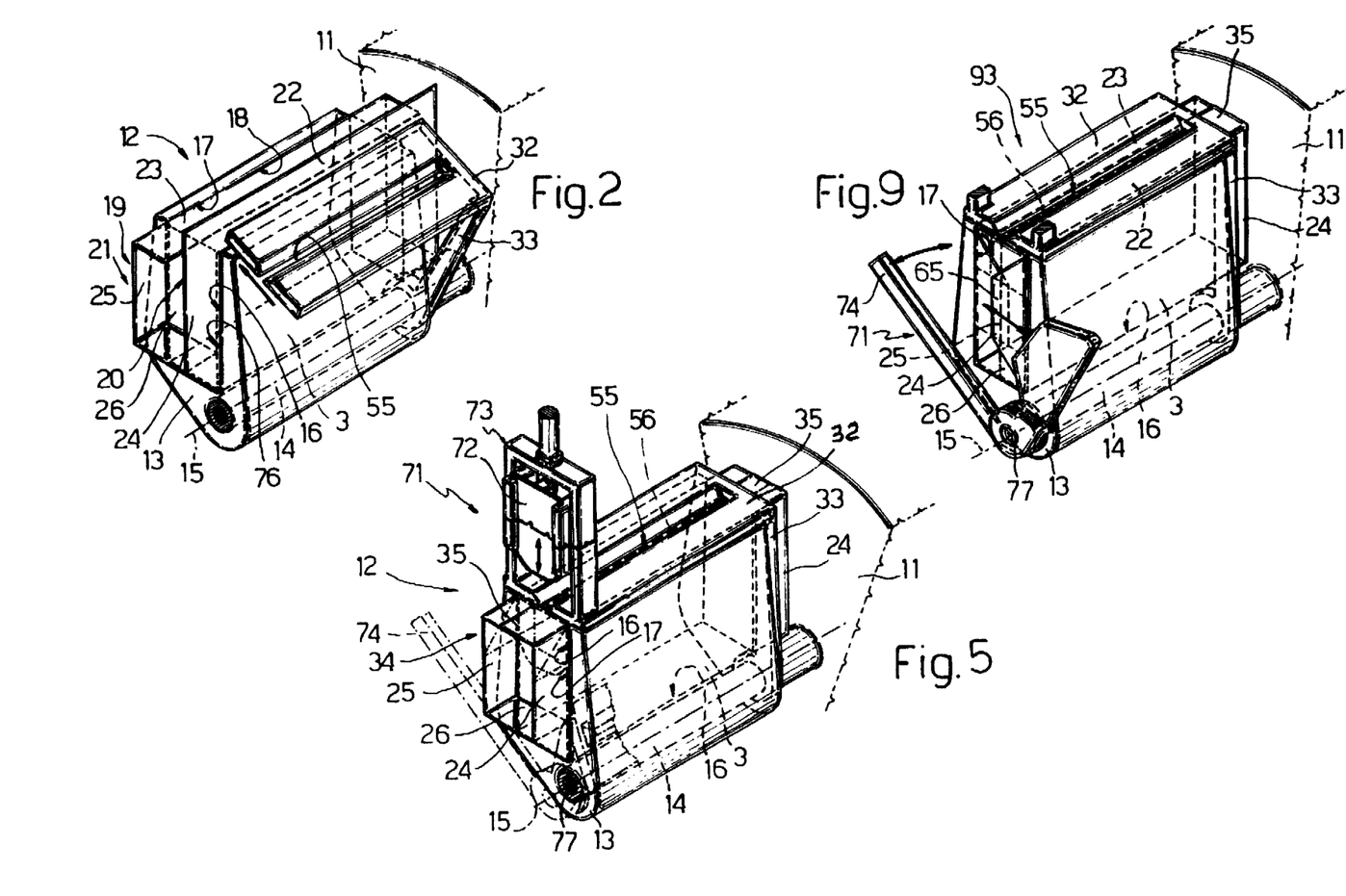
FIG. 2 shows a larger-scale view, with parts in section and parts removed for clarity, of a detail in FIG. 1.
FIG. 5 shows a partially sectioned view, with parts removed for clarity, of a detail in FIG. 4 in one operating position.
FIGS. 7, 8 and 9 show partially sectioned views, with parts removed for clarity, of respective embodiments of the FIG. 5 detail.

As shown in FIG. 2, device 7 comprises a disk 11 supporting a number of wrapping members 12 (only one shown) equally spaced about the axis of rotation (not shown) of disk 11, which axis is located crosswise to direction 6. Disk 11 is powered by a drive device (not shown) to rotate in steps about said axis and transfer members 12 from station 9 to station 10 along path portion P1.

Member 12 comprises a conveying element 13, which is fitted to the front of disk 11 by a tubular pin 14 projecting from disk 11 coaxially with its own axis 15 parallel to said axis of rotation, and presents a substantially U-shaped pocket 16 for housing a product 3 and a respective sheet 8. More specifically, pocket 16 presents an opening 17 extending on three sides of pocket 16, and is supplied, at station 9 and through an intermediate portion 18 of opening 17, with a product 3 together with a respective sheet 8. As product 3 is inserted inside pocket 16, sheet 8 is folded into a U to form an open tubular wrapping 19 wherein two end portions 20 and 21 of sheet 8 project outwards of opening 17 and in relation to product 3.

Portions 20 and 21 comprise respective longitudinal portions 22 and 23, which, when pocket 16 is at station 9, project rearwards from product 3 in direction 6 and face each other crosswise to direction 6; and respective pairs of transverse portions 24 and 25, which, when pocket 16 is at station 9, project laterally on either side of product 3 and face each other parallel to direction 6. Each transverse portion 24 is connected to respective transverse portion 25 by a respective intermediate connecting tab 26 perpendicular to portions 24 and 25.

Portion 23 is folded squarely onto a larger lateral surface 27 of product 3 by a folding device 28 located at station 9. More specifically, device 28 comprises a folding plate 29, which is moved back and forth in a direction crosswise to direction 6 by an actuator 29a to squarely fold portion 23. Two folding plates 30 (only one shown) on either side of path P are moved back and forth in direction 6 by respective actuators 30a to fold connecting tabs 26 squarely onto respective smaller lateral surfaces 31 of product 3.

Member 12 also comprises a folding plate 32 fitted to an arm 33 in turn fitted for rotation to pin 14 and connected to a known cam-tappet device (not shown) for rotating plate 32 about axis 15 as member 12 travels along path portion P1, and so partially folding portion 22 squarely onto portion 23 to form a further tubular wrapping 34 presenting tabs 26 contacting respective surfaces 31, and a further two tabs 35 defined by the lateral end portions of folded portions 22 and 23 projecting laterally on either side of product 3 and in relation to surfaces 31. Said cam-tappet device also provides for so positioning plate 32 as to close portion 18 of opening 17 and compress portion 22 onto portion 23 as product 3 travels along path portion P1.

At station 10, said cam-tappet device again moves plate 32 to free opening 17 and enable product 3, together with respective wrapping 34, to be transferred to device 5, which feeds product 3 through a folding station 36, downstream from station 10 along path P in direction 6, and where wrapping 2 is completed, and to a final output station 37 downstream from station 36 along path P.

Station 36 comprises a folding device 38 in turn comprising a pair of fixed folding plates 39 located on either side of path P and for folding tabs 35 squarely onto respective surfaces 31 as product 3 travels through station 36. Device 38 also comprises two pairs of helical plates 40 and 41 for respectively folding portions 25 squarely onto respective surfaces 31, and portions 24 partially onto respective portions 25 to form wrapping 2 as product 3 travels through station 36.

Station 37 comprises an unloading device 42 in turn comprising a substantially U-shaped pocket 43, which presents two lateral walls 44 on either side of path P and for cooperating with and compressing portions 24 onto respective portions 25. Pocket 43 also presents an actuator 45 for moving pocket 43 in a direction 46 crosswise to direction 6 to unload products 3 from station 37.

Machine 1 comprises a laser sealing assembly indicated as a whole by 47 and which provides for sealing portions 20 and 21 to each other. More specifically, assembly 47 comprises a laser sealing device 48 located at a sealing station 49 between stations 9 and 10 along portion P1 of path P. Machine 1 also comprises a further laser sealing device 50 located at a respective sealing station 51 substantially coincident with station 37.

Device 48 comprises a laser source 52 for emitting a laser beam 53, which is preferably only partly focused, by a reflecting and focusing device 54 and through a slit 55 formed in plate 32 parallel to axis 15, onto a sealing strip 56 extending along portion 22 and facing slit 55. Device 54 is fitted to machine 1, over device 7, and comprises a mirror 57, which is rotated about its axis 59 by an actuator 58 to reflect beam 53 through a focusing lens 60 movable with mirror 57, and so sweep beam 53 along strip 56 and seal portions 22 and 23 of wrapping 34 when product 3 is arrested, in use, at station 49.

Device 50 comprises two laser sources 61 on either side of path P and for emitting respective laser beams 62, which are preferably only partly focused, by a reflecting and focusing device 63, through respective slits 64 formed in walls 44 parallel to direction 6, onto respective sealing strips 65 extending along portions 24 and facing slits 64. Device 63 comprises for each source 61 a mirror 66 in a fixed position to the side of path P and for reflecting respective beam 62 through a focusing lens 67 to sweep beam 62 along strip 65 and seal portions 24 and 25 of wrapping 2 when product 3 is fed, in use, through station 51.

Alternatively, device 50 comprises, for each mirror 66, an actuator 68 for rotating mirror 66 and lens 67 about an axis 69 to sweep beam 62 along strip 65 when product 3, in use, is arrested at station 51.

Operation of machine 1 is clearly understandable from the foregoing description and therefore requires no further explanation. It should be pointed out, however, that laser sealing of portions 22, 23 and 24, 25 by respective devices 48 and 50 is made possible, firstly, because portion 22 and portions 24 are compressed respectively onto portion 23 and respective portions 25 during sealing, and, secondly, because beams 53 and 62 are only partly focused along respective strips 56 and 65, thus enabling sealing to be performed with no danger of burning, i.e. severing, portion 22 and portions 24.

Figure 3:
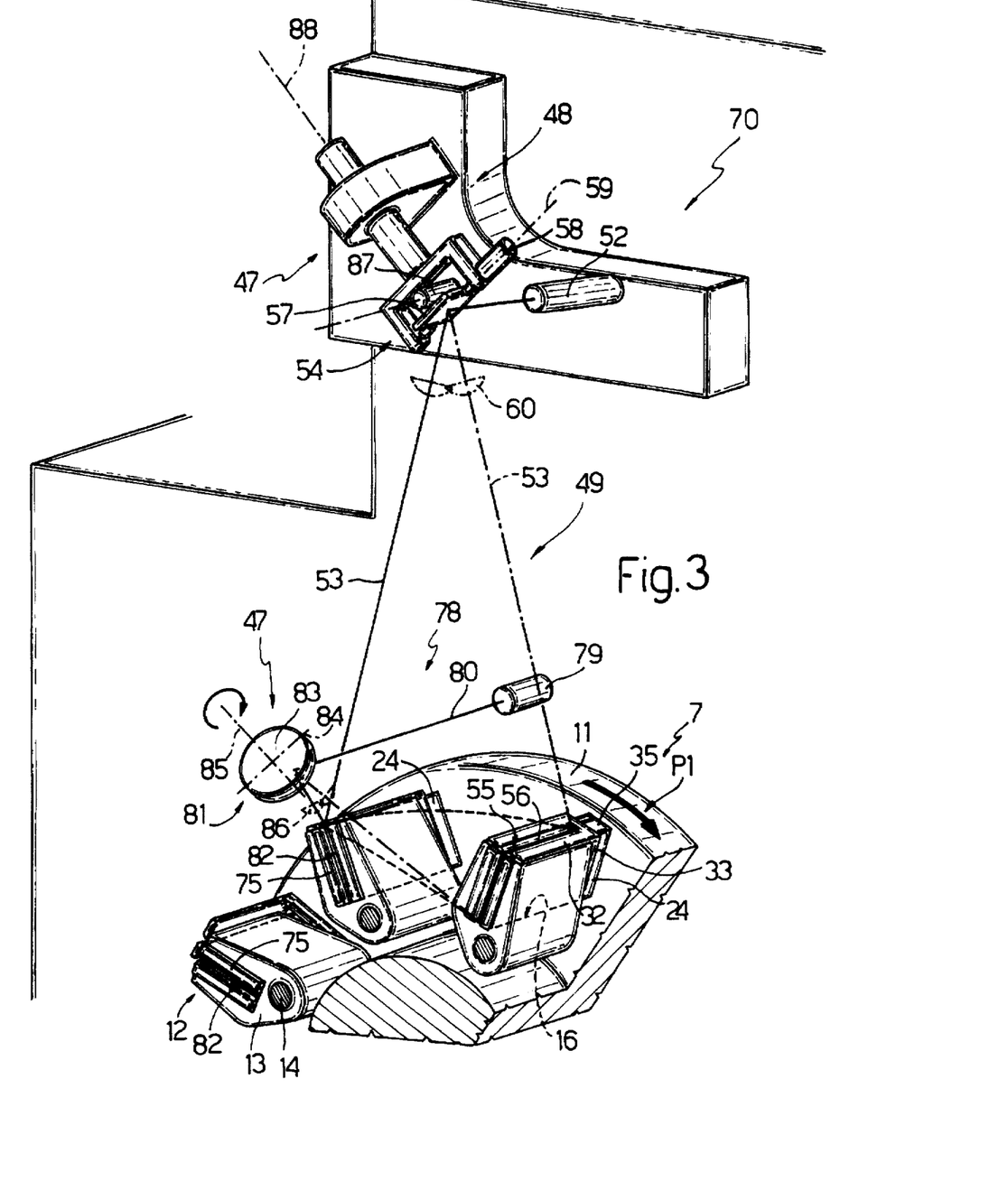
FIG. 3 shows a larger-scale view, with parts in section and parts removed for clarity, of a second preferred embodiment of the FIG. 1 machine.

The FIG. 3 variation relates to a wrapping machine 70 substantially similar to machine 1, except that machine 70 is a continuously-operating machine; portions 24 and 25 projecting from the opposite side of pocket 16 to disk 11 are folded by a folding device 71 forming part of member 12 and fitted to element 13; and strip 65 facing outwards of the opposite side of pocket 16 to disk 11 is sealed simultaneously with strip 56 along sealing station 49.

Figure 6:
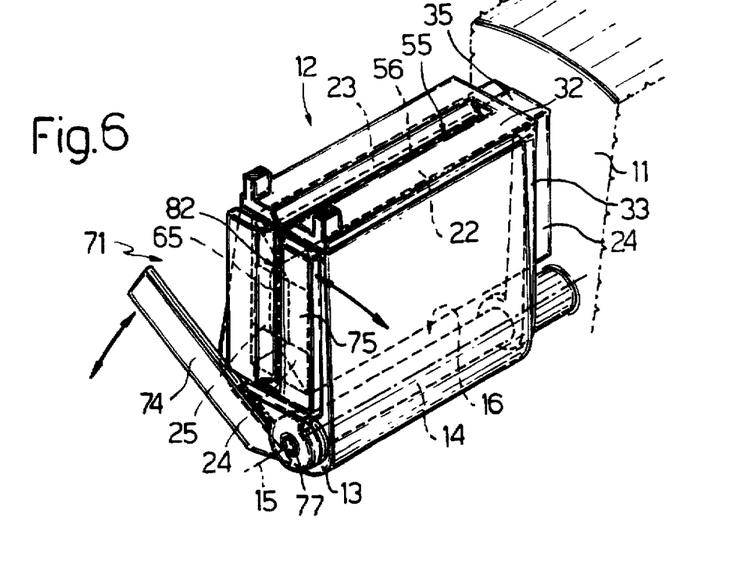
FIG. 6 shows a partially sectioned view, with parts removed for clarity, of a detail in FIG. 5 in a further operating position.

As shown in FIGS. 5 and 6, device 71 comprises a folding plate 72, which is fitted to a slide 73 integral with and over plate 32, and is moved in a radial direction by an actuator (not shown) to fold squarely onto surface 31 of product 3 the tab 35 defined by the lateral end portions of portions 22 and 23 folded onto surface 27 of product 3.

Device 71 also comprises a further two folding plates 74 and 75 located to the side of a lateral portion 76 of opening 17 on the opposite side of pocket 16 to disk 11, and which are fitted to a shaft 77 mounted for rotation inside pin 14 and oscillating about axis 15 by a known cam-tappet device (not shown). As member 12 travels along path portion P1, the cam-tappet device so moves plates 74 and 75 as to first fold portion 25 squarely onto surface 31 by means of plate 74, and then fold portion 24 partly over portion 25 by means of plate 75. The cam-tappet device also provides for so positioning plate 75 as to close portion 76 of opening 17 and compress portion 24 onto portion 25 as product 3 travels along path portion P1.

Figure 4:
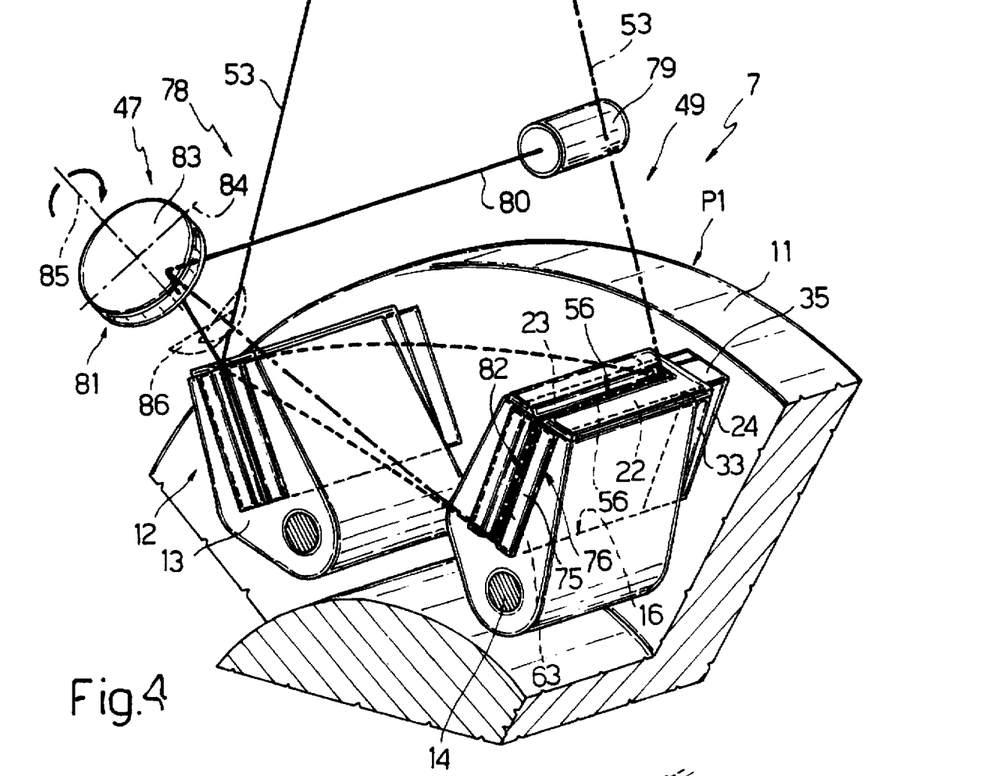
FIG. 4 shows a larger-scale view, with parts in section and parts removed for clarity, of a detail in FIG. 3.

As shown in FIGS. 3 and 4, sealing assembly 47 comprises a further sealing device 78, which replaces device 50 of machine 1, is located substantially over disk 11 at station 49, and provides for sealing portion 24 to portion 25 along strip 65 as product 3 travels through station 49.

Device 78 comprises a laser source 79 for emitting a laser beam 80, which is preferably only partly focused along strip 65 by a reflecting and focusing device 81 and through a radial slit 82 formed in plate 75. Device 81 is fitted to machine 1 facing disk 11, and comprises a mirror 83, which is rotated by a known actuator (not shown) about two perpendicular axes 84 and 85 coplanar with mirror 83, to reflect beam 80 through a focusing lens 86 movable with mirror 83, and so sweep beam 80 along strip 65 to seal portions 24 and 25.

More specifically, said actuator rotates mirror 83 about axis 84 to move and reflect beam 80 parallel to slit 82, and rotates mirror 83 about axis 85 to move and reflect beam 80 as product 3 travels through station 49. In other words, mirror 83 presents an operating movement about axis 84 to move beam 80 along strip 65, and a tracking movement about axis 85 to follow the moving product 3 with beam 80.

Since strip 56 is sealed simultaneously with strip 65 as product 3 travels through station 49, reflecting and focusing device 54 of sealing device 48 described previously also comprises a further actuator 87 for rotating mirror 57 about a further axis 88 perpendicular to axis 59, and so imparting to mirror 57 a tracking movement to move and reflect beam 53 as product 3 travels through station 49. In this case, mirror 57 therefore presents an operating movement about axis 59 to move beam 53 parallel to strip 56, and a tracking movement to follow strip 56 with beam 53 by moving beam 53 crosswise to strip 56. The other two portions 24 and 25 directly facing disk 11 may be folded and sealed by a sealing device (not shown) identical to device 78 and either located symmetrically with device 78 in relation to path portion P1, or downstream from device 78 along path P.

Operation of machine 70 is clearly understandable from that of machine 1 and from the foregoing description and therefore requires no further explanation.

From the foregoing description, and particularly with reference to the operating and tracking movements of mirrors 57 and 83, machine 70 may obviously also be operated in steps, strips 56 and 65 being sealed at each step of member 12.

Figure 7:
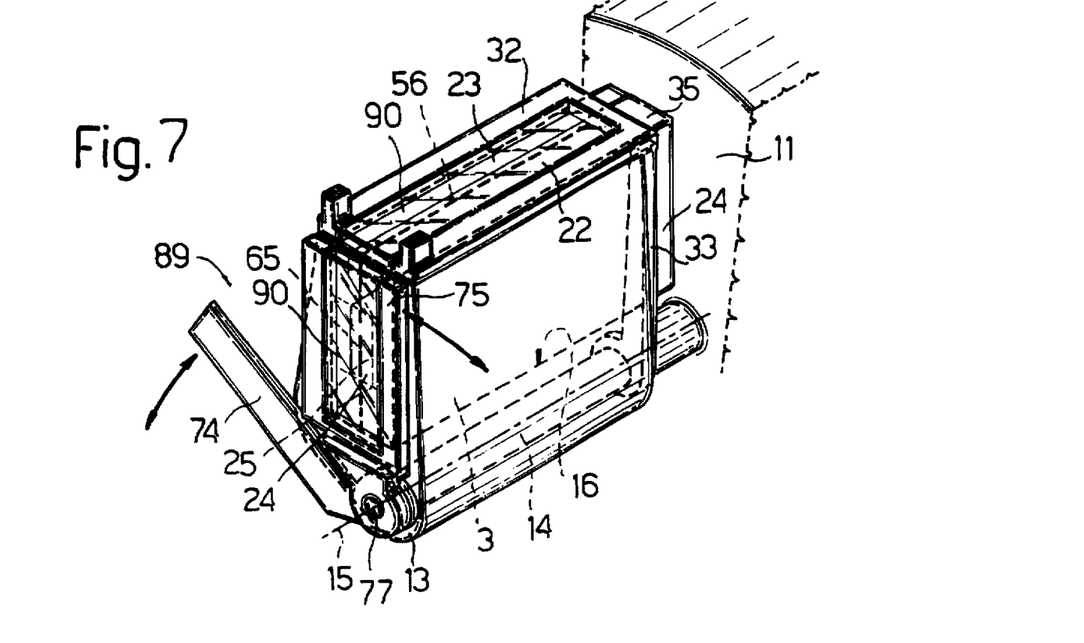

The FIG. 7 variation relates to a member 89 substantially similar to member 12, except that, as opposed to respective slits 55 and 82, plate 32 and plate 75 present respective elements 90 made of material permitting the passage of laser light, and through which respective beams 53 and 80 travel. Elements 90 also provide for compressing portion 22 onto portion 23, and portion 24 onto portion 25 during sealing.

Figure 8:
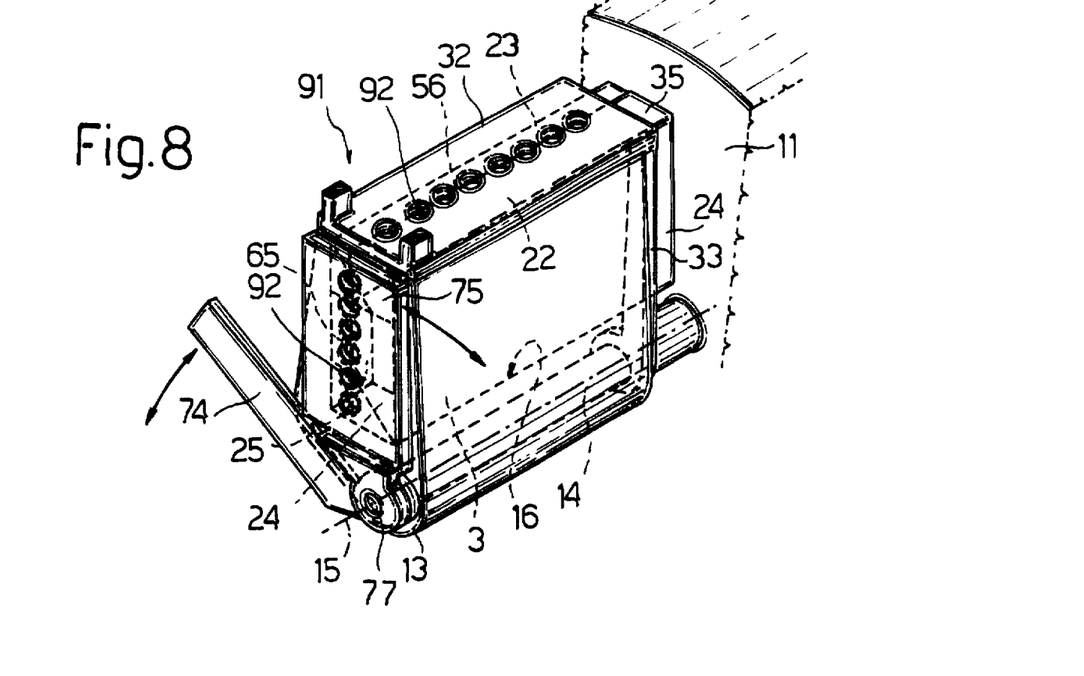

The FIG. 8 variation relates to a member 91 substantially similar to member 12, except that, as opposed to respective slits 55 and 82, plate 32 and plate 75 each present at least one number of holes 92 facing strips 56 and 65 respectively, and through which respective beams 53 and 80 travel.

The FIG. 9 variation relates to a member 93 substantially similar to member 12, except that plate 75 no longer presents slit 82, and is a sealing element for compressing and sealing portion 24 onto portion 25. In this case, plate 75 performs the functions of device 78, which may therefore be dispensed with; or plate 75 may be made of material permitting the passage of laser light, and be combined with device 78 to seal portion 24 to portion 25.

We claim:

1. A wrapping method for producing wrappings (2) for products (3), the method comprising the steps of folding a sheet (8) of wrapping material about a respective product (3), so that at least a first (20) and a second (21) portion of said sheet (8) of wrapping material are superimposed one on top of the other with the first portion (20) outside the second (21); and connecting said two portions (20, 21) to each other by sealing; the method being characterized in that said connecting step comprises the further steps of compressing said two portions (20, 21) onto each other, and sweeping at least one laser beam (53, 62; 53, 80) along a sealing portion (56, 65) of said first portion (20).

2. A method as claimed in claim 1, characterized by comprising the further step of feeding a product (3) in a given traveling direction (6) along a wrapping path (P) comprising at least one sealing station (49, 51); said connecting step being performed when said product (3) is located at the sealing station (49, 51).

3. A method as claimed in claim 2, characterized in that said sealing portion (56, 65) comprises a transverse sealing strip (56; 56, 65) crosswise to said traveling direction (6); said connecting step comprising the substep of moving the laser beam (53; 53, 80) along the transverse sealing strip (56; 56, 65).

4. A method as claimed in claim 3, characterized in that said connecting step comprises the further substep of arresting said product (3) at said sealing station (49).

5. A method as claimed in claim 3, characterized in that said connecting step comprises the further substep of moving the product (3) through said sealing station (49) in said traveling direction (6).

6. A method as claimed in claim 2, characterized in that said sealing portion (56, 65) comprises a parallel sealing strip (65) parallel to said traveling direction (6); said connecting step comprising the further substep of feeding said product (3), in said traveling direction (6), through said sealing station (51) and past said laser beam (62) located in a fixed position at said sealing station (51).

7. A method as claimed in claim 2, characterized in that said sealing portion (56, 65) comprises a parallel sealing strip (65) parallel to said traveling direction (6); said connecting step comprising the further substeps of arresting the product (3) at said sealing station (51), and moving said laser beam (62) along said parallel sealing strip (65).

8. A method as claimed claim 1, characterized in that said compressing step is performed by means of an external compressing element (32, 44; 32, 75) through which said laser beam (53, 62; 53, 80) travels at said sealing portion (56, 65).

9. A method as claimed in claim 8, characterized in that said external compressing element (32, 44; 32, 75) comprises at least one plate (32, 44; 32, 75) presenting a slit (55, 64; 55, 82) extending along the whole of said sealing portion (56, 65).

10. A method as claimed in claim 8, characterized in that said external compressing element (32, 44; 32, 75) comprises at least one plate (90) made of material permitting the passage of said laser beam (53, 62; 53, 80) and extending along the whole of said sealing portion (56, 65).

11. A method as claimed in claim 8, characterized in that said external compressing element (32, 44; 32, 75) comprises at least one plate (32, 75) presenting at least one succession of holes (92) along the whole of said sealing portion (56, 65).

12. A method as claimed in claim 2, characterized in that said connecting step comprises two sealing steps; said sealing portion (56, 65) comprising a first (56) and a second (65) sealing strip; the first sealing strip (56) being a transverse sealing strip (56) crosswise to said traveling direction (6); and the second sealing strip (65) being a parallel sealing strip (65) parallel to said traveling direction (6).

13. A method as claimed in claim 12, characterized in that one of said two sealing steps comprises the substep of sweeping a respective laser beam (53) along said first sealing strip (56) located in a fixed position at a respective sealing station (49).

14. A method as claimed in claim 13, characterized in that one of said two sealing steps comprises the substep of sweeping a respective laser beam (62) along said second sealing strip (65) located in a fixed position at a respective sealing station (51).

15. A method as claimed in claim 13, characterized in that one of said two sealing steps comprises the substep of moving said second sealing strip (65) through a respective sealing station (51) and past a respective laser beam (62) located in a fixed position at the sealing station (51).

16. A method as claimed in claim 2, characterized in that said connecting step comprises two sealing steps; each of said two sealing steps forming a seal along a respective sealing strip (56, 65) positioned crosswise to said traveling direction (6).

17. A method as claimed in claim 16, characterized in that said two sealing steps are performed simultaneously at a sealing station (49).

18. A method as claimed in claim 17, characterized in that said two sealing steps each comprise the substeps of feeding a product (3) through said sealing station (49), and tracking the moving product (3) with a respective laser beam (53, 80).

19. A method as claimed in claim 17, characterized in that said two sealing steps each comprise the substeps of arresting a product (3) at said sealing station (49), and sweeping a respective laser beam (53, 80) along the respective sealing strip (56, 65).

20. A method as claimed in claim 1, characterized in that said laser beam is only partly focused.

21. A machine (1; 70) for producing wrappings for products (3), the machine (1; 70) comprising wrapping means (7) for folding a sheet (8) of wrapping material about a respective product (3), so that at least a first (20) and a second (21) portion of said sheet (8) of wrapping material are superimposed one on top of the other with the first portion (20) outside the second (21); and at least one connecting means (47) for connecting said two portions (20, 21) by sealing; the machine (1; 70) being characterized by comprising compressing means (32, 44; 32, 75) for compressing said two portions (20, 21) onto each other; and a sealing assembly (47) comprising at least one laser source (52, 61; 52, 79) for emitting a respective laser beam (53, 62; 53, 80) with which to sweep a sealing portion (56, 65) of said first portion (20).

22. A machine as claimed in claim 21, characterized by comprising conveying means (4, 5, 7) for feeding a product (3) in a given traveling direction (6) along a wrapping path (P) comprising at least one sealing station (49, 51); said laser source (52, 61; 52, 79) emitting the respective laser beam (53, 62; 53, 80) when said product (3) is located, in use, at the sealing station (49, 51).

23. A machine as claimed in claim 22, characterized in that said sealing portion (56, 65) comprises a transverse sealing strip (56) crosswise to said traveling direction (6); said connecting means (47) comprising reflecting and focusing means (54) for sweeping said laser beam (53) along the transverse sealing strip (56) as said conveying means (4, 5, 7), in use, feed the product (3) through said sealing station (49).

24. A machine as claimed in claim 22, characterized in that said sealing portion (56, 65) comprises a transverse sealing strip (56) crosswise to said traveling direction (6); said connecting means (47) comprising reflecting and focusing means (54) for sweeping said laser beam (53) along the transverse sealing strip (56) upon said conveying means (4, 5, 7) arresting the product (3), in use, at said sealing station (49).

25. A machine as claimed in claim 22, characterized in that said sealing portion (56, 65) comprises a parallel sealing strip (65) parallel to said traveling direction (6); said connecting means (47) comprising reflecting and focusing means (63) for reflecting said laser beam (62) onto the parallel sealing strip (65) as said conveying means (4, 5, 7) feed the product (3), in use, through said sealing station (51).

26. A machine as claimed in claim 22, characterized in that said sealing portion (56, 65) comprises a parallel sealing strip (65) parallel to said traveling direction (6); said connecting means (47) comprising reflecting and focusing means (63) for sweeping said laser beam (62) along the parallel sealing strip (65) upon said conveying means (4, 5, 7) arresting the product (3), in use, at said sealing station (51).

27. A machine as claimed in claim 21, characterized in that said compressing means (32, 44; 32, 75) comprise at least one external compressing element (32, 44; 32, 75), which is superimposed on said sealing portion (56, 65), and through which said laser beam (53, 62; 53, 80) travels.

28. A machine as claimed in claim 27, characterized in that said external compressing element (32, 44; 32, 75) comprises at least one plate (32, 44; 32, 75) presenting a slit (55, 64; 55, 82) extending along the whole of said sealing portion (56, 65).

29. A machine as claimed in claim 27, characterized in that said external compressing element (32, 44; 32, 75) comprises at least one plate (90) made of material permitting the passage of said laser beam (53; 53, 80), and extending along the whole of said sealing portion (56, 65).

30. A machine as claimed in claim 27, characterized in that said external compressing element (32, 44; 32, 75) comprises at least one plate (32, 75) presenting at least one succession of holes (92) along the whole of said sealing portion (56, 65).

31. A machine as claimed in claim 22, characterized in that said sealing assembly (47) comprises two laser sealing devices (48, 50) located at respective sealing stations (49, 51); said sealing portion (56, 65) comprising a first (56) and a second (65) sealing strip; the first sealing strip (56) being a transverse sealing strip crosswise to said traveling direction (6); and the second sealing strip (65) being a parallel sealing strip parallel to said traveling direction (6).

32. A machine as claimed in claim 31, characterized in that one (48) of said two sealing devices (48, 50) comprises a reflecting and focusing device (54) for sweeping a respective laser beam (53) along said first sealing strip (56) located in a fixed position at a respective sealing station (49).

33. A machine as claimed in claim 32, characterized in that one (50) of said two sealing devices (48, 50) comprises a reflecting and focusing device (63) for sweeping a respective laser beam (62) along said second sealing strip (65) located in a fixed position at a respective sealing station (51).

34. A machine as claimed in claim 32, characterized in that one (50) of said two sealing devices (48, 50) comprises a reflecting and focusing device (63) for reflecting said laser beam (62) onto said second sealing strip (65) as said conveying means feed the product (3), in use, through a respective sealing station (51).

35. A machine as claimed in claim 22, characterized in that said sealing assembly (47) comprises two laser sealing devices (48, 78) at a single sealing station (49); each of said sealing devices (48, 78) forming a seal along a respective sealing strip (56, 65) crosswise to said traveling direction (6).

36. A machine as claimed in claim 35, characterized in that each of said two sealing devices (48, 78) comprises a respective reflecting and focusing device (54, 81) for sweeping a respective laser beam (53, 80) along the respective said sealing strip (56, 65) as said conveying means feed a product (3), in use, through said sealing station (49).

37. A machine as claimed in claim 35, characterized in that each of said two sealing devices (48, 78) comprises a respective reflecting and focusing device (54, 81) for sweeping a respective laser beam (53, 80) along the respective said sealing strip (56, 65) upon said conveying means (4, 5, 7) arresting a product (3), in use, at said sealing station (51).

38. A machine as claimed in claim 21, characterized in that said laser beam is only partly focused.

* * * * *